United States Patent [19]

Ono et al.

[11] Patent Number: 5,241,035
[45] Date of Patent: Aug. 31, 1993

[54] GRAFT COPOLYMER AND COATING COMPOSITION BY USE THEREOF

[75] Inventors: Ichiro Ono, Annaka; Hiroshi Yoshioka, Tokyo, both of Japan

[73] Assignee: Shin-Etsu Chemical Co., Ltd., Tokyo, Japan

[21] Appl. No.: 762,365

[22] Filed: Sep. 19, 1991

[30] Foreign Application Priority Data

Sep. 20, 1990 [JP] Japan ................... 2-250732

[51] Int. Cl.$^5$ ............................................. C08G 77/44
[52] U.S. Cl. ........................................ 528/26; 525/58; 525/102; 528/28; 528/56
[58] Field of Search .............. 525/58, 102; 528/26, 528/28, 56

[56] References Cited

U.S. PATENT DOCUMENTS

| | | | |
|---|---|---|---|
| 3,332,900 | 7/1967 | Reischl et al. | 525/58 |
| 3,790,437 | 2/1974 | Haley et al. | 525/58 |
| 5,045,599 | 9/1991 | Murase | 525/104 |

*Primary Examiner*—Melvyn I. Marquis
*Assistant Examiner*—D. Aylward
*Attorney, Agent, or Firm*—Nixon & Vanderhye

[57] ABSTRACT

A graft copolymer, comprising a trunk polymer comprising a vinyl chloride/vinyl alcohol copolymer containing vinyl chloride and vinyl alcohol as the essential constituent monomer units, and a branch polymer comprising an organopolysiloxane grafted onto said trunk polymer, and a coating composition comprising said graft copolymer as the main component. The coating formed from the composition is excellent in slippage, water repellency and mold release properties in addition to good characteristics derived from the vinyl chloride/vinyl alcohol resin.

8 Claims, No Drawings

GRAFT COPOLYMER AND COATING COMPOSITION BY USE THEREOF

BACKGROUND OF THE INVENTION

1. Field of the Invention

This invention relates to a graft copolymer having an organopolysiloxane grafted onto a trunk polymer comprising a vinyl chloride/vinyl alcohol copolymer, and a coating composition composed mainly of the graft copolymer.

2. Description of the Prior Art

Vinyl chloride/vinyl alcohol resins having vinyl chloride and vinyl alcohol as constituent monomer units have such advantages (1) that they form coated films excellent in toughness, flexibility and flame retardancy, (2) that they form coated films excellent in alkali resistance, oil resistance and chemical resistance, (3) that they are well compatible with other resins for coated films, particularly alkyd resins, (4) they are excellent in solubility in solvents, etc., and therefore have been used for various uses, including intermediate painting for ship paints, metal protective paints, wood paints, metal finishing paints, binder resins for recording medium, resins for being mixed into alkyd resins, etc. In such vinyl chloride/vinyl alcohol resins, for the purpose of imparting further special functions such as slippage, water repellency, mold release, etc., addition of silicone oils has been investigated in the prior art.

However, since dimethyl silicone oil has no compatibility with vinyl chloride/vinyl alcohol resins, if it is added to said resin, there have been involved such drawbacks that the film became turbid, or the surface characteristics were worsened. On the other hand, when a silicone oil improved in compatibility by modification with the pheyl group, a long chain alkyl group, polyoxyalkylene, etc. is added, although the above drawbacks can be cancelled, there has been involved the drawback that the effects such as mold release, slippage or water repellency cannot persist. Accordingly, in order to improve durability of the mold release, etc., there has been also made an attempt to add a reactive silicone oil having reactive group such as

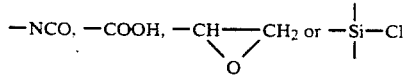

etc. which react with hydroxyl groups of polyvinyl chloride resins. But in this case, there is a problem in pot-life of the resin obtained, or addition of a catalyst or heating was required, whereby the use range was disadvantageously limited.

SUMMARY OF THE INVENTION

Accordingly, an object of the present invention is to provide a graft copolymer improved in slippage, water repellency, mold release, etc. in addition to the specific features as described above possessed by vinyl chloride/vinyl alcohol resins and a coating composition utilizing the same.

More specifically, the present invention provides a graft copolymer, comprising a trunk polymer comprising a vinyl chloride/vinyl alcohol copolymer containing vinyl chloride and vinyl alcohol as its essential constituent monomer units, and a branch polymer comprising an organopolysiloxane grafted to said trunk polymer.

Also, the present invention provides a coating composition, comprising the graft copolymer as specified above and a solvent in which said graft copolymer is dissolved.

The graft copolymer of the present invention has an organopolysiloxane grafted through a non-hyrolyzable linkage to the vinyl chloride/vinyl alcohol copolymer, and therefore in the coating composition composed mainly of such graft copolymer, there is no drawback of poor compatibility between the vinyl chloride/vinyl alcohol polymer component and the silicone component. Also, since a coating excellent in slippage, water repellency and mold release as well as durability of these characteristics can be obtained, it is suitable for high function paints, coating films for heat-sensitive recording, binders for magnetic tape, coatings with mold release property, water repellency, etc.

Graft copolymer

The vinyl chloride/vinyl alcohol copolymer to be used as the trunk polymer in the graft copolymer of the present invention can be suitably chosen from known ones. Said vinyl chloride/vinyl alcohol copolymer contains vinyl chloride and vinyl alcohol as the essential constituent monomer units. Preferably, it may have a polymerization degree of 200 to 1,000, and a molar ratio of vinyl chloride units/vinyl alcohol units of 95/5 to 60/40.

The vinyl copolymer can contain monomer units other than vinyl chloride and vinyl alcohol, and an example of such monomers is vinyl acetate.

Preferable one of the vinyl copolymers is a terpolymer of vinyl chloride/vinyl alcohol/vinyl acetate.

To show specifically a preferable example, the terpolymer represented by the following formula (I) may be included:

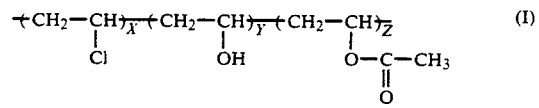

wherein X is an integer of 120 to 950, Y is an integer of 6 to 401, and Z is an integer of 0 to 200, preferably 5 to 200.

An example of the graft copolymer having an organopolysiloxane graft onto the terpolymer of the formula (I) may be represented by the formula (II):

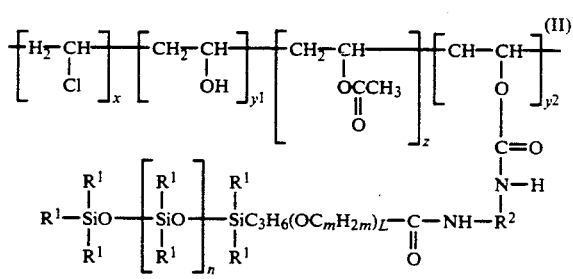

wherein plural $R^1$'s may be either the same or different, and each represent a monovalent hydrocarbon group, $R^2$ is a divalent organic group, L an integer of 0 to 50, m an integer of 2 or 3, n an integer of 3 to 100, X an integer of 120 to 950, $Y^1$ an integer of 5 to 400, Z an integer of 5 to 200, $Y^2$ an integer of 1 to 200 and $X + Y^1 + Z + Y^2$ is in the range from 200 to 1,000]. Preferably, $Y^1/X = 5/95$ to $40/60$, $Z/X = 5/95$ to $40/60$. The sum of $Y^1$ and $Y^2$ corresponds to Y in the formula (I).

Examples of the monovalent hydrocarbon group represented by $R^1$ may include alkyl groups such as methyl, ethyl, propyl, butyl, octyl, decyl and the like; the phenyl; flourine-substituted alkyl groups such as triflouropropyl groups, etc. Usually, the methyl group is employed.

Specific examples of the divalent organic group R may include those shown below:

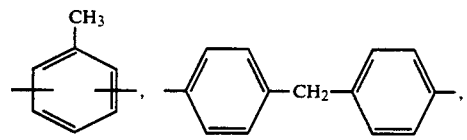

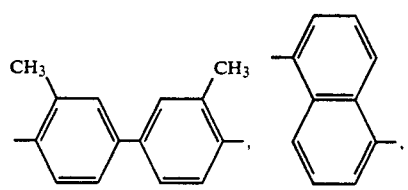

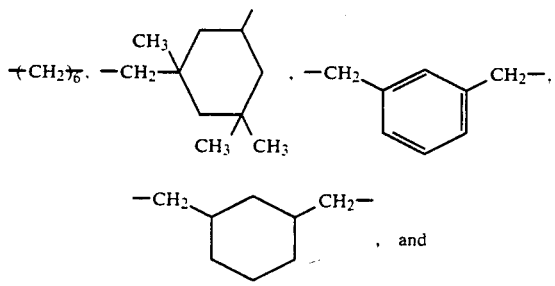

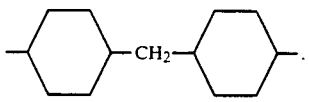

, and

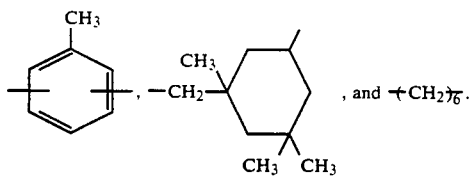

Preferably, R represents the group of:

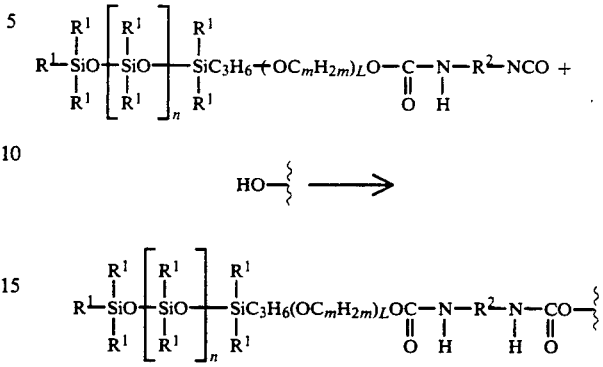

Preparation of graft copolymer

The graft copolymer of the present invention can be easily synthesized by allowing an organopolysiloxane having an isocyanate group at one terminal end to react with a hydroxyl group possessed by the vinyl chloride/-vinyl alcohol copolymer which becomes the trunk polymer as shown by the following equation:

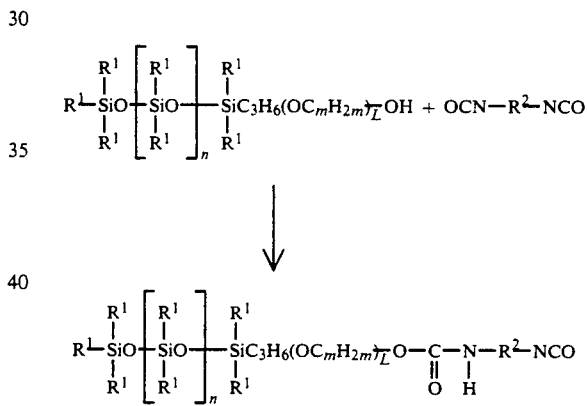

wherein the above formulas $R^1$, $R^2$, L, m and n are the same as defined above. The wavy line ($\sim$) indicates the backbone chain of the vinyl chloride/vinyl alcohol copolymer.

The organopolysiloxane having an isocyanate group at one terminal end as mentioned above can be synthesized by allowing a known organopolysiloxane containing a hydroxyl group at one terminal end with one of the tow isocyanate groups possessed by a diisocyanate compound as shown below.

Specific examples of the diisocyanate compound which can be used in the above reaction may include tolylene diisocyanate, diphenylmethane diisocyanate, tolydine diisocyanate, naphthalene diisocyanate, hexamethylene diisocyanate, isophorone diisocyanate, xylyene diisocyanate, hydrogenated xylylene diisocyanate, hydrogenated diphenylmethane diisocyanate and the like.

On the other hand, specific examples of the organopolysiloxane having an isocyanate group at one terminal end may include the compounds represented by the following formulae.

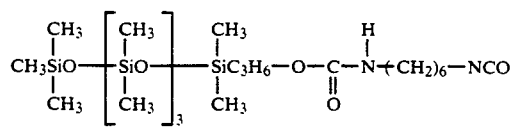

-continued

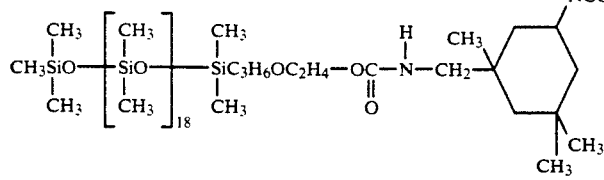

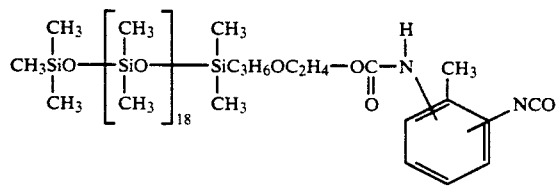

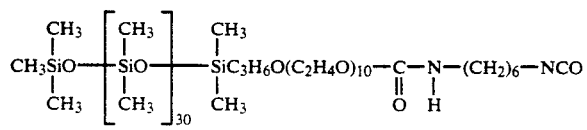

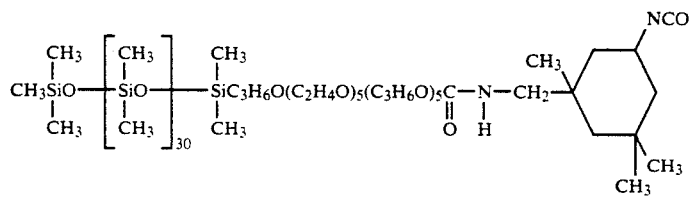

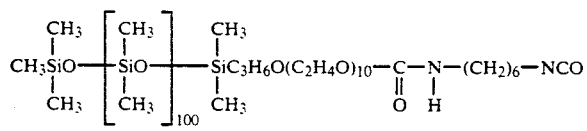

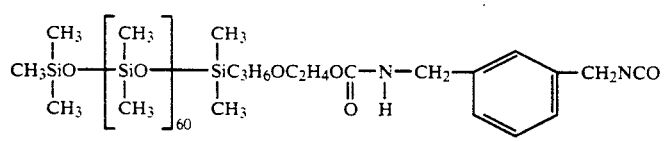

The reaction between the organopolysiloxane having an isocyanate group and the vinyl copolymer having hydroxyl groups and the reaction between the organopolysiloxane containing a hydroxyl group at one terminal end and the diisocyanate compound proceed similarly. In these reactions, a solvent may be either employed or not, but in the case of either reaction, a solvent may be preferably employed, because the reaction can be controlled more easily.

The solvents to be used in this case includes esters such as methyl acetate, ethyl acetate, butyl acetate, isobutyl acetate and the like; ketones such as acetone, methyl ethyl ketone, methyl isobutyl ketone, diisobutyl ketone, cyclohexanone and the like; aromatic hydrocarbons such as benzene, toluene, xylene and the like; ethers such as diethyl ether, dibutyl ether, tetrahydrofuran, dioxane and the like, which can be used either singly or as a mixture of two or more.

In either of the above reactions, if necessary, an organic tin compound such as dibutyltin dilaurate, dibutyltin dioctoate, etc. can be added as a catalyst into the reaction system at a concentration of 0.01 to 1% by weight, whereby the reaction can be completed within a short time. The reaction temperature may be generally 50° to 100° C., and the reaction time 2 to 10 hours.

Coating composition

As the coating composition of the present invention, the graft copolymer solution obtained as described above may be also used as it is, or the graft copolymer may be separated and dissolved in another solvent. Into said composition, if necessary, other solvents, crosslinking agents, resins other than the above graft copolymer, various additives such as fillers can be added in any desired combination.

The solvent which may be optionally added is used for the purpose of controlling viscosity, dryability, film thickness, etc., but its kind is not particularly limited. Such solvents include the solvents for the reaction as mentioned above as a matter of course, and further it is possible to use alcohols such as methanol, ethanol, isopropanol, n-butanol or the like; cellosolves such as methylcellosolve, ethylcellosolve, butylcellosolve or the like; and so on. These solvents may be used either singly or in combination of two or more. The concentration of the graft copolymer may be preferably 1 to 30% by weight, more preferably 0.1 to 50% by weight.

The coating composition of the present invention may be obtained only by dissolving the above graft copolymer in a solvent, whereby a constantly dry type paint can be obtained, but by further formulating a polyfunctional isocyanate compound as a crosslinking agent, a normal temperature curable paint excellent in solvent resistance can be also obtained.

The above polyfunctional isocyanate compound is inclusive of the diisocyanate compounds as described above, but further includes, for example, polyisocyanate compounds such as trimethlolpropane-modified tolylene diisocyanate, isocyanurate bonded tolylene diisocyanate having the formula:

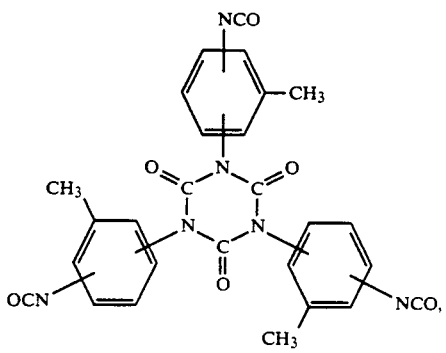

trimethylolpropane-modified hexamethylene diisocyanate, isocyanurate bonded hexamethylene diisocyanate having the formula:

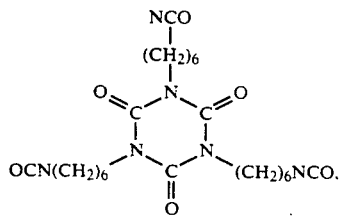

buret bonded hexamethylene diisocyanate having the formula:

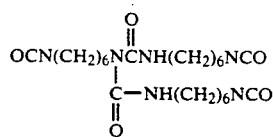

trimethylolpropane-modified isophorone diisocyanate, isocyanurate bonded isophorone diisocyanate and like. The polyfunctional isocyanate compound may be added suitably in an amount such that the amount of the isocyanate groups may be 0.5 to 2.0 equivalent, preferably 0.8 to 1.5 equivalents per one equivalent of the hydroxyl groups of the graft copolymer. In this case, as the crosslinking accelerator, for example, an organic tin compound such as dibutyltin dioctoate, dibutyltin dilaurate, etc. may be also added in a minute amount to accelerate crosslinking.

The coating composition of the present invention is composed mainly of the graft copolymer, but, if necessary, other resins such as phenol resin, epoxy resin, urethane resin, urea resin, melamine resin, alkyd resin, etc. may be also formulated.

Also, for the purpose of improving the strength of the film, inorganic fillers such as silica, alumina, glass powder, clay, talc, calcium carbonate, mica powder, titanium dioxide, wallastonite, magnesium hydroxide, etc. may be also added, and other additives such as antioxidants, antiaging agents, antistatic agents, colorants, etc. may be also formulated.

For formation of a film, the coating composition may be coated uniformly on the substrate surface according to such method as dipping, brushing, spin coating, spraying using an applicator, etc., and then cured by heating at about 20° to 150° C. The film thickness may be generally about 1 to 500 $\mu$m.

Presumably, the coating composition composed mainly of the graft copolymer of the present invention exhibits good slippage, water repellency and mold release properties, because the organopolysiloxane which is the branch component is concentrated on the coated surface.

EXAMPLES

The present invention will now be described in more detail by referring to examples, by which the present invention is not limited at all.

Synthesis of Orcanopolysiloxane Containing an Isocyanate Group at One Terminal End Synthesis example 1

A one liter glass reactor equipped with a condenser, a thermometer, a dropping funnel and a stirring device was charged with 43.1 g of isophorone diisocyante, 350 g of ethyl acetate and 0.7 g of dibutyltin dilaurate, and the temperature was elevated to 60° C. in nitrogen gas stream. Subsequently, 306.9 g of the organopolysiloxane containing a hydroxyl group at one terminal end represented by the following formula:

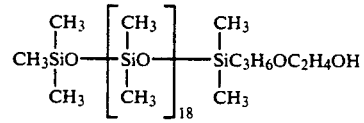

was added dropwise, and the reaction was carried out under the temperature conditions of 60° to 70° C. for 5 hours, followed by removal of ethyl acetate under reduced pressure. As the result, 336 g of a pale yellow transparent liquid with a viscosity of 360 centistokes at 25° C. and a refractive index of 1.4198 at 25° C. was obtained. The liquid was found by IR spectroscopic analysis and $^1$HNMR spectroscopic analysis to be an organopolysiloxane containing an isocyanate group at one terminal end represented by the following structure:

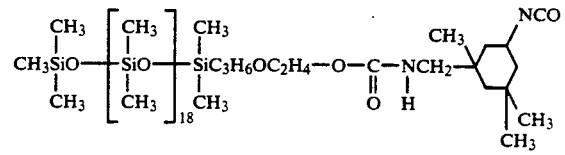

Synthesis examples 2-5

In each example, synthesis was carried out according to the same procedure as in Synthesis example 1 except for replacing the isophorone diisocyanate and the organopolysiloxane containing a hydroxyl group at one terminal end by the compounds shown in Table 1 to obtain an organopolysiloxane containing an isocyanate group at one terminal end shown in Table 2.

and 280 g of toluene, and the temperature was elevated under a nitrogen gas stream to 60° C. After confirmation that the resin was completely dissolved, 10 g of the

TABLE 1

| Synthesis Example | Diisocyanate compound | Organopolysiloxane containing a hydroxyl group at one terminal end |
|---|---|---|
| 2 | Isophoron diisocyanate | $CH_3SiO(CH_3)_2-[Si(CH_3)_2O]_3-Si(CH_3)_2C_3H_6OC_2H_4OH$ |
| 3 | Isophoron diisocyanate | $CH_3SiO(CH_3)_2-[Si(CH_3)_2O]_{100}-Si(CH_3)_2C_3H_6OC_2H_4OH$ |
| 4 | Hexamethylene diisocyanate | $CH_3SiO(CH_3)_2-[Si(CH_3)_2O]_{18}-Si(CH_3)_2C_3H_6OH$ |
| 5 | Hexamethylene diisocyanate | $CH_3SiO(CH_3)_2-[Si(CH_3)_2O]_{18}-Si(CH_3)_2C_3H_6(OC_2H_4)_{10}OH$ |

TABLE 2

| Synthesis Example | Organopolysiloxane containing an isocyanate group at one terminal end |
|---|---|
| 2 | $CH_3SiO(CH_3)_2-[Si(CH_3)_2O]_3-Si(CH_3)_2-C_3H_6OC_2H_4OC(O)-N(H)-CH_2-$ [isophorone-NCO ring] |
| 3 | $CH_3SiO(CH_3)_2-[Si(CH_3)_2O]_{100}-Si(CH_3)_2-C_3H_6OC_2H_4OC(O)-N(H)-CH_2-$ [isophorone-NCO ring] |
| 4 | $CH_3SiO(CH_3)_2-[Si(CH_3)_2O]_{18}-Si(CH_3)_2-C_3H_6-OC(O)-N(H)-(CH_2)_6-NCO$ |
| 5 | $CH_3SiO(CH_3)_2-[Si(CH_3)_2O]_{18}-Si(CH_3)_2-C_3H_6(OC_2H_4)_{10}OC(O)-N(H)-(CH_2)_6-NCO$ |

EXAMPLE 1

A one liter glass reactor equipped with a condenser, a thermometer, a dropping funnel and a stirring device was charged with 100 g of a vinyl chloride/vinyl alcohol/vinyl acetate copolymer (average polymerization degree: about 430, trade name MPR-TA, produced by Nisshin Kagaku Kogyo K. K.), 280 g of ethyl acetate organopolysiloxane containing an isocyanate group at one terminal end obtained in Synthesis example - 1 was added dropwise, and the reaction was carried out at a temperature of 60° to 70° C. for 8 hours to obtain a pale yellow transparent viscous liquid. By IR spectroscopic analysis of the liquid obtained, not only the absorption at 2,260 cm$^{-1}$ due to NCO group disappeared, but also absorptions at 802 cm$^{-1}$, 1027 cm$^{-1}$, 1094 cm$^{-1}$, and 1260 cm$^{-1}$ due to methylpolysiloxanes were observed, whereby formation of a vinyl chloride/vinyl alcohol/vinyl acetate copolymer grafted with the organopolysiloxane was confirmed.

EXAMPLES 2-7

Graft copolymers were synthesized in the same manner as described in Example 1 except for replacing the vinyl chloride/vinyl alcohol/vinyl acetate copolymer and the organopolysiloxane containing an isocyanate group at one terminal end used in Example 1 by those as shown in Table 3.

TABLE 3

| Example | Vinyl chloride/ vinyl alcohol copolymer | Organopolysiloxane containing an isocyanate group at one end | |
|---|---|---|---|
| 2 | MPR-TA | Product in Synthesis Example 1 | 30 g |
| 3 | MPR-TA | Product in Synthesis Example 2 | 30 g |
| 4 | MPR-TA | Product in Synthesis Example 3 | 5 g |
| 5 | MPR-TAH* | Product in Synthesis Example 4 | 20 g |
| 6 | MPR-TAH* | Product in Synthesis Example 5 | 30 g |
| 7 | MPR-TAH* | Product in Synthesis Example 1 | 10 g |

*MPR-TAH: A vinyl chloride/vinyl alcohol/vinyl acetate copolymer with an average polymerization degree of about 600 produced by Nisshin Kagaku Kogyo K.K.

EXAMPLE 8-14

The graft copolymer solutions obtained in Examples 1-7 were diluted with a solvent mixture of methyl ethyl ketone/isopropyl alcohol (weight ratio 1/1) to a solid content of 5% by weight, coated by a spinner on an aluminum plate, followed by drying at 100° C. for one minute, to obtain a transparent film with a film thickness of about 5 μm. For the film, contact angle of water and dynamic frictional coefficient were measured according to the methods shown below to obtain the results as shown in Table 4.

Contact angle of water:
Measured at 25° C. by use of a contact angle meter (tradename: CA-A, produced by Kyowa Kagaku K. K.)

Dynamic frictional coefficient:
Measured under the following conditions by use of a dynamic frictional coefficient meter (produced by Kyowa Kagaku K. K.)

Friction member: SUS stainless steel ball, load: 50 g
Speed: 20 cm/min., temperature: 25° C.

COMPARATIVE EXAMPLE 1

The vinyl chloride/vinyl alcohol/vinyl acetate copolymer (tradename: MPR-TA) was dissolved in methyl ethyl ketone to a solid content of 5% by weight, and the coating performances were examined according to the same procedure as in Examples 8-14 to obtain the results shown in Table 4.

TABLE 4

| | Resin used | Contact angle of water (degree) | Dinamic frictional coefficient |
|---|---|---|---|
| Example 8 | Graft copolymer of Example 1 | 100 | 0.12 |

TABLE 4-continued

| | Resin used | Contact angle of water (degree) | Dinamic frictional coefficient |
|---|---|---|---|
| Example 9 | Graft copolymer of Example 2 | 102 | 0.10 |
| Example 10 | Graft copolymer of Example 3 | 98 | 0.15 |
| Example 11 | Graft copolymer of Example 4 | 100 | 0.13 |
| Example 12 | Graft copolymer of Example 5 | 101 | 0.11 |
| Example 13 | Graft copolymer of Example 6 | 95 | 0.12 |
| Example 14 | Graft copolymer of Example 7 | 100 | 0.15 |
| Comparative Example 1 | MPR-TA | 83 | 0.35 |

We claim:

1. The graft copolymer, which is represented by the formula (II):

$$\left[\begin{array}{c}H_2-CH\\|\\Cl\end{array}\right]_x \left[\begin{array}{c}CH_2-CH\\|\\OH\end{array}\right]_{y1} \left[\begin{array}{c}CH_2-CH\\|\\OCCH_3\\\|\\O\end{array}\right]_z \left[\begin{array}{c}CH-CH\\|\quad|\\O\quad\\\quad|\\\quad C=O\\\quad|\\\quad N-H\\\quad|\\\quad R^2\end{array}\right]_{y2}$$

$$R^1-\underset{R^1}{\overset{R^1}{\underset{|}{Si}}}O\left[\underset{R^1}{\overset{R^1}{\underset{|}{Si}}}O\right]_n \underset{R^1}{\overset{R^1}{\underset{|}{Si}}}C_3H_6(OC_mH_{2m})_L-\underset{\|}{\overset{}{C}}-NH-R^2$$

wherein plural R$^1$'s may be either the same or different and each represent a monovalent hydrocarbon group, R$^2$ is a divalent organic group, L an integer of 0 to 50, m an integer of 2 or 3, n an integer of 3 to 100, X an integer of 120 to 950, Y$^1$ an integer of 5 to 400, Z an integer of 5 to 200, Y$^2$ an integer of 1 to 200, and X+Y$^1$+Z+Y$^2$ is in the range from 200 to 1,000.

2. The graft copolymer according to claim 1, wherein Y$^1$/X is in the range of 5/95 to 40/60, Z/X is in the range of 5/95 to 40/60.

3. The graft copolymer according to claim 1, wherein R$^2$ is represented by the formula:

[chemical structures: phenylene, -CH$_2$-cyclohexyl with methyl groups, and -(CH$_2$)$_6$-]

4. A coating composition comprising a graft copolymer as recited in claim 1 and a solvent in which said graft copolymer is dissolved.

5. The composition according to claim 4, further comprising a polyfunctional isocyanate compound.

6. The composition according to claim 5, wherein the polyfunctional isocyanate compound is contained in an amount such that the amount of the isocyanate groups there of is in the range of 0.5 to 2.0 equivalents per equivalent of the hydroxyl groups of the graft copolymer.

7. The composition according to claim 5, further containing an organic tin compound as a crosslinking accelerator.

8. The composition according to claim 4, wherein said solvent is selected from alcohols, cellosolves, esters, ketones, aromatic hydrocarbons and ethers.

* * * * *